Sept. 13, 1932.　　　　J. SWINNEY　　　　1,877,747
INTERLOCKING MECHANISM
Filed Feb. 18, 1931
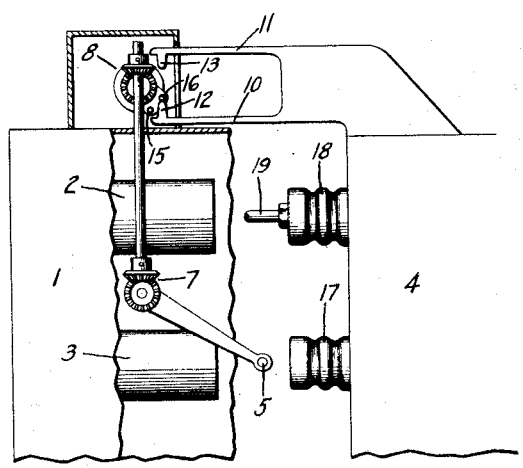
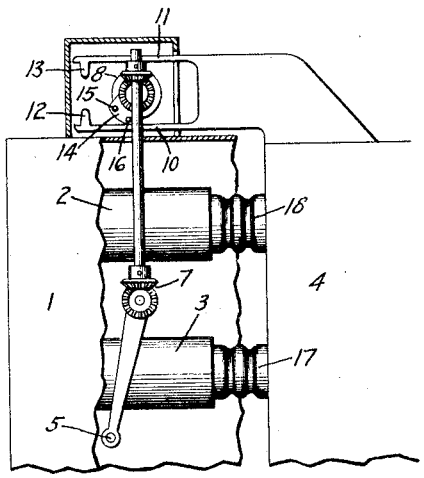
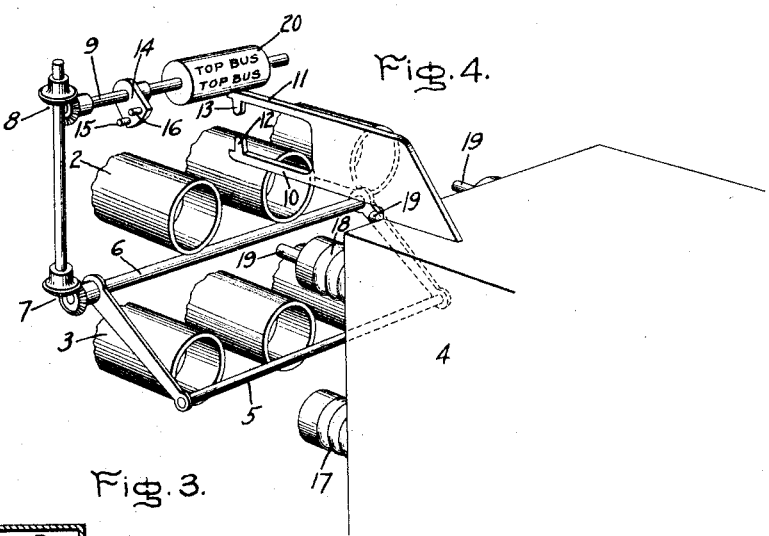
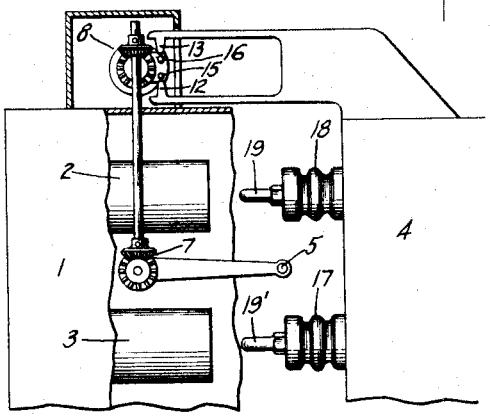
Inventor:
John Swinney,
by Charles E. Mullan
His Attorney.

Patented Sept. 13, 1932

1,877,747

UNITED STATES PATENT OFFICE

JOHN SWINNEY, OF WEST DIDSBURY, ENGLAND, ASSIGNOR TO GENERAL ELECTRIC COMPANY, A CORPORATION OF NEW YORK

INTERLOCKING MECHANISM

Application filed February 18, 1931, Serial No. 516,761, and in Great Britain March 28, 1930.

My invention relates to interlocking mechanism for electrical switchgear of the draw-out type having alternate circuits as main and auxiliary busbars and a movable unit arranged to be electrically connected to either of said busbars.

The principal object of my invention is the provision of an improved interlocking mechanism for switchgear of the aforesaid type operative to prevent electrical connection between said movable unit and both of said busbar circuits when the unit is in the operative or fully "in" position.

In accordance with my invention the improved interlocking mechanism, although not limited thereto, is located generally on the stationary part of the switchgear housing the main and auxiliary buses, and comprises an interlocking bar which may be moved to either one of three different positions when the movable unit of the switchgear is in the withdrawn or isolated position. The interlocking bar, with the movable unit in the withdrawn position, is limited to these three positions, two of which obstruct the connections on the movable unit corresponding to the bus connections on the stationary structure. In the obstructing positions above referred to only contacts in the unobstructed connections are operative to engage the corresponding bus connections. In the third position the bar does not obstruct the connections above referred to but instead blocks the movement of the movable unit towards the busbars. Only in the event that the contacts on said movable unit are operative to make connection with but one bus, is the interlocking bar automatically moved to an unobstructing position by and in accordance with movement of said unit towards the busbars.

My invention will be more fully set forth in the following description referring to the accompanying drawing, and the features of novelty which characterize my invention will be pointed out with particularity in the claims annexed to and forming a part of this specification.

Referring to the drawing, Fig. 1 is a fragmentary, elevational view, partly in section, of switchgear of the draw-out type provided with interlocking mechanism embodying my invention; Fig. 2 is a similar view of the apparatus illustrated in Fig. 1 in the fully "in" or operative position; Fig. 3 is a view similar to Figs. 1 and 2 illustrating the interlocking mechanism in a blocking position; and Fig. 4 is a perspective view of the apparatus shown in Fig. 1 in a completely withdrawn position.

In Figs. 1 to 3 there is illustrated electrical switchgear of the draw-out type comprising a stationary structure 1 having connection shields 2 and 3 for alternate electrical circuits, as main and auxiliary busbar circuits for example, (not shown), and a movable unit 4, as a truck-type circuit breaker having connections corresponding to the main and auxiliary bus connections within the shields 2 and 3. The movable unit 4 may be mounted for rectilinear movement with respect to the stationary structure 1 in any well known manner and may be racked or rolled into and out of operative position by means well known in the art. The unit 4 is likewise arranged to make an electrical connection with a feeder or branch circuit through a plug and socket connection (not shown) arranged beneath the main and auxiliary bus connections. Since, however, the method of connecting a feeder or branch circuit through a circuit breaker to either a main or auxiliary bus is so well known, a complete understanding of the present invention may be had by referring to and illustrating only the main and auxiliary bus connections.

For the purpose of insuring electrical connection between the unit 4, and hence the branch circuit, and but one of the bus connections, there is provided interlocking mechanism comprising a bar 5 pivotally mounted on a shaft 6 suitably supported in the stationary structure 1. The bar 5 is operatively connected in a suitable manner, as by the beveled gearing 7 and 8, to an operating shaft 9 likewise mounted with respect to the structure 1. The position of the bar 5 is controlled by and in accordance with the position of the movable unit 4 by means of a rack and pin connection comprising a pair of jaw-like arms 10 and 11 carried by the unit 4 and provided adjacent the outer ends thereof with actuating lugs or teeth 12 and 13 in opposing relation. Mounted on the operating shaft 9 is a member 14 having the spaced pins 15 and 16 in the plane of movement of the teeth 12 and 13. The arrangement is such that under certain conditions the teeth 12 and 13 engage the pins 15 and 16 to rotate the operating shaft 9 and hence the bar 5 in one direction or the other, or, in the event that the bar 5 is in an intermediate position as illustrated in Fig. 3, move on opposite sides of the pins 15 and 16 without actuating the same.

The two sets of 3-phase connections in the unit 4 (Fig. 4) are provided with insulating socket members 17 and 18 within which plug-type contacts 19 may be detachably mounted. The contacts 19 of one set, when the unit 4 is moved into position, move into the hollow insulating shields 2 or 3 on the stationary structure to engage the corresponding bus connections.

When the unit 4 is in its normally withdrawn or isolated position, movement of the interlocking bar 5 to a position opposite one of the connections is effective to preclude insertion of contacts 19 in those connections. Therefore when the bar is in that position, the contacts 19 may be mounted only in the other set of connections to connect with but one bus.

The operation of the interlocking mechanism is as follows:

Assuming that the unit 4 is connected to the top bus through the contact 19, referring for the purpose of clarity to a single phase, and is to be withdrawn to the normally isolated position illustrated in Fig. 1, the consequent withdrawal of the unit 4 causes counterclockwise rotation of the bar 5, through the tooth 12 and the pins 15 and 16, to a position substantially opposite the vacated socket 17. In this position, the operator may if he desires transfer the removable contact 19 to the socket 17 to make connection with the lower bus, in which case he moves the bar 5 away from the socket 17 upwardly to a position now opposite the vacated contact 18. Further movement of the bar 5 in this direction is prevented by engagement of the pins on the member 14 with the jaw 11. In a similar manner downward movement of the bar 5 from the position illustrated in Fig. 1 is prevented by the engagement of the pins with the jaw 10. Consequently, the bar 5, in the normally withdrawn position of the unit 4, is limited to three positions, two of these positions being opposite the vacated sockets 17 and 18 and the third being in a position intermediate the aforesaid positions.

Movement of the unit 4 to make connection with one of the buses is accompanied by rectilinear movement of the jaws 10 and 11 and, assuming that the top bus is being connected, the bar 5 is rotated clockwise from its obstructing position opposite the socket 17 to a vertical unobstructing position illustrated in Fig. 2 by engagement of the tooth 12 between the pins 15 and 16. When the unit 4 is withdrawn the tooth 12 engages the pin 16 to rotate the bar 5 back to its original position. The operation is similar when the contact 19 is changed to make connection with the lower bus except that the bar 5 is rotated in an opposite direction from the position opposite the socket 18 into a vertical unobstructing position substantially 180° from the position shown in Fig. 2.

Assuming now that the operator wishes to change the connection from the upper to the lower bus and in doing so moves the bar 5 into the intermediate position and inserts another plug contact 19' in the socket 17, it will be apparent that unless the contact is removed from the socket 18 to permit movement of the bar 5 into the corresponding position the unit 4 is blocked. In other words, the bar 5 being intermediate the upper and lower positions will not be rotated to an unobstructing position but will on the other hand directly block the unit 4. When the operator finds that he cannot roll the unit 4 into position he immediately detects the trouble and returns the unit 4 to its withdrawn position in which the contact 19 may be quickly removed so as to permit the bar 5 to be swung clear to an unobstructing position when the unit is again rolled in to connect with the lower bus.

In order that the operator may also have a visual indication of the selected busbar connections or the connection actually made, the shaft 9 is provided with a drum type indicator 20 having two indications each as illustrated for both the "top bus" and the "bottom bus." With this arrangement the indicator informs the operator that the switchgear, when in the withdrawn position, is in proper order to engage either the top or bottom bus and also informs him what bus is in operation in the fully "in" position of the unit. When the bar is in the intermediate position illustrated in Fig. 3 the indicator is blank and clearly informs the operator that movement of the unit 4 towards operative position will be obstructed.

It should be understood that my invention is not limited to specific details of construction and arrangement thereof herein illustrated, and that changes and modifications may occur to one skilled in the art without departing from the spirit of my invention.

What I claim as new and desire to secure by Letters Patent of the United States is:

1. In electrical switchgear of the draw-out type including stationary structure having connections for alternate circuits and a movable unit having connections arranged to engage either of said circuit connections, interlocking mechanism for insuring connection between said unit and but one of said circuits comprising an interlocking bar, said bar operable, when said unit is in its withdrawn position, to block movement of said unit towards operative position in the event that the connections on said unit are operative to engage both corresponding circuit connections, and means operable by said unit for moving said bar to an unobstructing position during normal operation thereof.

2. In electrical switchgear of the draw-out type including stationary structure having connections for alternate circuits and a movable unit having connections arranged to engage either of said circuit connections, interlocking mechanism comprising a bar pivotally mounted with respect to said stationary structure, removable contacts for the connections of said movable unit arranged to engage either of said circuit connections, said bar operable in the withdrawn position of said unit to prevent use of said removable contacts in more than one circuit connection, said bar being otherwise in an intermediate position for preventing movement of said unit to operative position, and means operable by said movable unit for rotating said bar into an unobstructing position when said contacts are arranged to connect said unit with but one of said circuits.

3. In electrical switchgear of the draw-out type including a stationary structure having main and auxiliary bus connections and a movable switch unit having removable contacts arranged to connect said unit with either of said bus connections, interlocking mechanism for preventing simultaneous connection between said unit and said main and auxiliary bus connections comprising a bar pivotally mounted with respect to said stationary structure and movable to one of three positions in the withdrawn position of said unit, one of said positions being intermediate said removable contacts for blocking movement of said unit towards operative position when said contacts are in position to connect with both said main and auxiliary bus connections, the other two positions being normally occupied by said removable contacts so that but one bus connection may be made, when said bar is in one of said last-named positions, and means operated by said movable unit for rotating said bar from either of said last-named positions to an unobstructing position for permitting engagement of said unit with but one of said bus connections.

4. Interlocking mechanism for switchgear of the draw-out type having main and auxiliary buses and a movable unit comprising two sets of connections corresponding to the main and auxiliary bus connections and removable contacts for the connections on said unit, said interlocking mechanism comprising a pivoted interlocking bar having three positions in the withdrawn position of said unit, two of said positions being opposite either of said sets of connections for precluding mounting of said removable contacts in one of them, the other of said positions being intermediate said connections for blocking movement of said unit for swinging said bar from either of said first-named positions to an unobstructing position.

5. Interlocking mechanism for electrical switch-gear of the draw-out type including stationary structure having main and auxiliary bus connections and a switch unit movable with respect thereto having two sets of connections corresponding to said main and auxiliary bus connections, comprising an interlocking bar pivotally mounted with respect to said stationary structure, contacts detachable with respect to the connections on said unit, said interlocking bar being movable to one of three positions in the withdrawn position of said unit, one of said positions being intermediate said connections for blocking movement of said unit towards operative position and the other two of said positions being opposite either of said sets of connections for preventing arrangement of said detachable contacts in but one set of them, and means operable by said unit for swinging said bar from either of said last-named positions into an unobstructing position and for returning said bar upon withdrawal of said unit to its original position.

6. Interlocking mechanism for electrical switch-gear of the draw-out type having main and auxiliary bus connections and a switch unit movable with respect thereto having sets of connections corresponding to said main and auxiliary bus connections, comprising a pivotally mounted interlocking bar, contacts detachable with respect to the connections on said unit, and means operable by said unit for rotating said bar to an unobstructing position when said unit is connected to one of said busses, said means returning said bar to its original position upon withdrawal of said unit, said bar in the withdrawn position of said unit being limited by said means to three positions, two of said positions being substantially the positions normally occupied by said sets of main and auxiliary bus contacts, the other of said positions being intermediate said connections for blocking movement of said unit towards operative position.

7. Interlocking mechanism for electrical switch-gear of the draw-out type having main and auxiliary bus connections and a switch unit movable with respect thereto having sets of connections corresponding to said main and auxiliary bus connections, comprising contacts detachably mounted with respect to the connections on said unit, a pivotally mounted interlocking bar, a rack and pin connection operatively connecting said bar with said unit, said connection in the withdrawn position of said unit limiting said bar to three positions, two of said positions being substantially the positions normally occupied by said sets of main and auxiliary bus contacts, the other of said positions being intermediate said positions whereby said rack and pin connection is ineffective to move said bar from blocking said unit, said rack and pin connection being operative to move said bar from either of said first-named positions to an unobstructing position during movement of said unit to operative position and for returning said bar to its original position upon withdrawal of said unit.

8. In electrical switchgear of the draw-out type including main and auxiliary bus connections and a switch unit movable with respect thereto having sets of connections corresponding to said main and auxiliary bus connections, interlocking and bus indicating mechanism comprising a pivotally mounted interlocking bar, contacts detachable with respect to the connections on said unit, means operatively connecting said interlocking bar to said unit, said means limiting said bar in the withdrawn position of said unit to three positions, one of said positions blocking the mounting of contacts with respect to one set of connections, another position blocking mounting of contacts with respect to the other set of connections and the third position being intermediate said positions for blocking movement of said unit, said bar being automatically rotated from either of said first two positions to an unobstructing position during movement of the unit to connect with one of said busses, and an indicating member operatively connected to said bar for designating in both the operative and withdrawn positions of said unit the selected bus connection.

In witness whereof I have hereunto set my hand.

JOHN SWINNEY.